(12) United States Patent
Jin et al.

(10) Patent No.: US 11,111,691 B2
(45) Date of Patent: Sep. 7, 2021

(54) SIDE SUPPORTING TYPE VEHICLE ROOF TENT

(71) Applicant: Q-YIELD OUTDOOR GEAR LTD., Fujian (CN)

(72) Inventors: Qiu Jin, Xiamen (CN); Nanqing Zhou, Xiamen (CN); Muhua Mao, Xiamen (CN); Ming Chen, Xiamen (CN)

(73) Assignee: Q-YIELD OUTDOOR GEAR LTD., Fujian (CN)

(*) Notice: Subject to any disclaimer, the term of this patent is extended or adjusted under 35 U.S.C. 154(b) by 0 days.

(21) Appl. No.: 16/631,453

(22) PCT Filed: May 28, 2018

(86) PCT No.: PCT/CN2018/088637
§ 371 (c)(1),
(2) Date: Jan. 16, 2020

(87) PCT Pub. No.: WO2019/227271
PCT Pub. Date: Dec. 5, 2019

(65) Prior Publication Data
US 2020/0180498 A1 Jun. 11, 2020

(51) Int. Cl.
*E04H 15/06* (2006.01)
*E04H 15/48* (2006.01)
*B60P 3/38* (2006.01)

(52) U.S. Cl.
CPC .............. *E04H 15/06* (2013.01); *B60P 3/38* (2013.01); *E04H 15/48* (2013.01)

(58) Field of Classification Search
CPC ......... E04H 15/02; E04H 15/06; E04H 15/34; E04H 15/46; E04H 15/48; B60P 3/38
See application file for complete search history.

(56) References Cited

U.S. PATENT DOCUMENTS

| | | | | |
|---|---|---|---|---|
| 2,291,900 A | * | 8/1942 | Jimmes | B60P 3/38 135/88.13 |
| 2,920,802 A | * | 1/1960 | Cook | B60R 9/055 224/328 |
| 3,018,782 A | * | 1/1962 | Hershberger | E04H 15/06 135/88.16 |

(Continued)

FOREIGN PATENT DOCUMENTS

CN   105089332 A   * 11/2015
CN   204754424 U   * 11/2015
(Continued)

*Primary Examiner* — David R Dunn
*Assistant Examiner* — Danielle Jackson
(74) *Attorney, Agent, or Firm* — Leong C. Lei (57) ABSTRACT

A side supporting type vehicle roof tent comprises a tent rack and a tent cloth fitted inside the tent rack. The tent rack comprises a base, a top cover, and at least one support connecting rod; the rear end of the top cover is pivotally connected to the rear end of the base; the support connecting rod is provided between the base and the top cover; one end of the support connecting rod is connected to the top cover, and the other end is connected to the base; the tent cloth is provided between the top cover and the base in a matching manner; the tent cloth between the front end of the top cover and the front end of the base is provided with an opening. The tent is simple in structure and easy to unfold or fold.

7 Claims, 8 Drawing Sheets

(56) References Cited

U.S. PATENT DOCUMENTS

| | | | | |
|---|---|---|---|---|
| 3,255,466 | A * | 6/1966 | Weizer | B60P 3/38 5/119 |
| 3,499,175 | A * | 3/1970 | Orberg | A47C 17/64 5/113 |
| 3,685,061 | A * | 8/1972 | Wray | B60P 3/1025 5/119 |
| 3,823,975 | A * | 7/1974 | Cooper | B60P 3/341 296/173 |
| 3,924,365 | A * | 12/1975 | Orberg | B60P 3/38 52/63 |
| 4,055,366 | A * | 10/1977 | Lee | B60P 3/38 296/160 |
| 4,057,283 | A * | 11/1977 | Barnett | B60P 3/341 296/173 |
| 4,077,662 | A * | 3/1978 | Kauffman | B60P 3/38 296/165 |
| 4,099,534 | A * | 7/1978 | Corbin | E04H 15/06 135/150 |
| 4,251,102 | A * | 2/1981 | Lee | B60P 3/38 135/88.16 |
| 4,653,800 | A * | 3/1987 | Myers | B60P 3/38 135/88.16 |
| 4,973,101 | A * | 11/1990 | Sagstetter | B60P 3/38 296/160 |
| 5,544,671 | A * | 8/1996 | Phillips | B60P 3/341 135/150 |
| 7,712,820 | B1 * | 5/2010 | Kyle | B60P 3/341 296/173 |
| 8,079,380 | B2 * | 12/2011 | Engstrom | E04H 15/001 135/96 |
| 8,826,928 | B2 * | 9/2014 | Zhou | E04H 15/46 135/151 |
| 9,169,665 | B1 * | 10/2015 | Zhou | E04H 15/48 |
| 9,194,153 | B2 * | 11/2015 | Makos | E04H 15/02 |
| 9,499,999 | B2 * | 11/2016 | Zhou | E04H 15/02 |
| 10,077,574 | B1 * | 9/2018 | Currid | E04H 15/48 |
| 10,590,675 | B2 * | 3/2020 | Zhou | E04H 15/008 |
| 10,676,955 | B1 * | 6/2020 | Tufto | E04H 15/001 |
| 10,760,295 | B2 * | 9/2020 | Attema | B60P 3/341 |
| 10,829,028 | B2 * | 11/2020 | Delgadillo, Jr. | B60J 7/1657 |
| 2014/0174221 | A1 * | 6/2014 | Wu | H02K 7/06 74/89.23 |
| 2018/0010357 | A1 * | 1/2018 | Zhou | E04H 15/06 |
| 2019/0291630 | A1 * | 9/2019 | Fittro | B60P 3/341 |
| 2021/0025190 | A1 * | 1/2021 | Montesalvo | E04H 15/54 |
| 2021/0164257 | A1 * | 6/2021 | Montesalvo | E04H 15/06 |

FOREIGN PATENT DOCUMENTS

| | | | | |
|---|---|---|---|---|
| CN | 208010030 U | * | 10/2018 | |
| WO | WO-2017024549 A1 | * | 2/2017 | ............ E04H 15/46 |
| WO | WO-2018014153 A1 | * | 1/2018 | ............ E04H 15/06 |
| WO | WO-2018112726 A1 | * | 6/2018 | ............ E04H 15/06 |
| WO | WO-2019227265 A1 | * | 12/2019 | ............ E04H 15/06 |
| WO | WO2021012661 A1 | * | 1/2021 | |

* cited by examiner

SIDE SUPPORTING TYPE VEHICLE ROOF TENT

BACKGROUND OF THE INVENTION

1. Field of the Invention

The present invention relates to a tent, and more particularly, to a side supporting type vehicle roof tent.

2. Description of the Prior Art

The continuous increase of privately owned cars allows travels by self-driving a new way of enjoying trips. To suit the need of people for driving to travel by themselves, products attachable to cars to help people to make the self-driving trips and tents for cars have been developed for such a need.

A tent for cars may be structured for installation on the roof of a car. This makes the tent different from the regular camp tents by being set distant from the ground when it is set up so as to help prevent the invasion of moisture and cold air from the ground, making it more comfortable in use. Car roof tents are known, such as Chinese Patent CN201531147U, issued on Jul. 21, 2010; CN202187605U, issued on Apr. 11, 2012; and CN203213695U, issued Sep. 25, 2013.

The conventional car tent is generally made up of a base and a tent frame mounted on the base. The tent frame can be expanded or collapsed. A variety of structures are available for expanding and collapsing a tent frame, some being completely manually operated, some being semi-automatic devices that are operated with hand cranking, while the other allowing for fully automatic operations. However, the support structure of the entire tent is relatively complicated and the cost is high, which causes the market price to remain high.

SUMMARY OF THE INVENTION

The primary object of the present invention is to provide a side supporting type vehicle roof tent that is simple in structure, easy to unfold or fold, and low in costs.

In order to achieve the above object, the present invention adopts the following technical solutions:

A side supporting type vehicle roof tent comprises a tent rack and a tent cloth fitted inside the tent rack. The tent rack includes a base, a top cover, and at least one support connecting rod. A rear end of the top cover is pivotally connected to a rear end of the base. The support connecting rod is disposed between the base and the top cover. A first end of the support connecting rod is connected to the top cover, and a second end of the support connecting rod is connected to the base. The tent cloth is fitted between the top cover and the base. The tent cloth between a front end of the top cover and a front end of the base is provided with an opening.

Preferably, the support connecting rod of the tent rack is a telescopic rod. The first end of the support connecting rod is pivotally connected to the top cover, and the second end of the support connecting rod is pivotally connected to the base.

Alternatively, the support connecting rod of the tent rack is a screw rod. The first end of the support connecting rod is pivotally connected to the top cover or the base, and the second end of the support connecting rod is slidably disposed on the base or the top cover.

Preferably, the support connecting rod is disposed on either side of the tent rack.

Preferably, a retaining wall is provided on an outer periphery of the top cover facing the base, and a raised wall is provided on an outer periphery of a top of the base. The retaining wall corresponds to the raised wall. The tent cloth is disposed between the retaining wall and the raised wall.

Preferably, the tent rack further includes a U-shaped front support rod having two vertical rods, a transverse rod and a U-shaped opening facing downward. The two vertical rods of the front support rod are pivotally connected to the front end of the base. The tent cloth is fitted on the transverse rod of the front support rod. The opening of the tent cloth is disposed in the U-shaped opening of the front support rod.

Preferably, the two vertical rods of the front support rod are telescopic rods.

Preferably, the tent rack further includes at least one top support rod. A first end of the top support rod is connected to the front end of the top cover, and a second end of the top support rod is connected to the transverse rod of the front support rod.

Preferably, the first end of the top support rod is pivotally connected to a middle portion of the front end of the top cover, and the second end of the top support rod is provided with a C-shaped retaining ring. The C-shaped retaining ring is detachably connected to a middle portion of the transverse rod of the front support rod.

Preferably, the top support rod includes two top support rods. First ends of the two top support rods are fixedly connected to two sides of the front end of the top cover, and second ends of the two top support rods are detachably connected to two sides of the transverse rod of the front support rod through C-shaped retaining rings.

Preferably, a bottom of the base is provided with a mounting rail that cooperates with a luggage rack on the top of a vehicle.

Preferably, the top cover and the base are pivoted together through at least one hinge.

Preferably, the support connecting rod is disposed at inner sides of the retaining wall and the raised wall.

By adopting the above solution, the rear end of the top cover of the tent rack of the present invention is directly pivotally connected to the rear end of the base, and then the support connecting rod is provided between the base and the top cover, so that unfolding and folding of a tent is implemented. When the tent is unfolded or folded, the front end of the top cover is only required to be controlled to be unfolded or folded with respect to the front end of the base, and the tent cloth is unfolded or folded with the tent rack in a linkage manner. The tent is simple in structure, easy to unfold or fold, low in costs, and has market competitiveness.

DETAILED DESCRIPTION OF THE PREFERRED EMBODIMENTS

Embodiments of the present invention will now be described, by way of example only, with reference to the accompanying drawings.

As shown in FIG. 1 through FIG. 8, the present invention discloses a side supporting type vehicle roof tent, comprising a tent rack 10 and a tent cloth 20 fitted inside the tent rack 10. The tent rack 10 includes a base 1, a top cover 2, and at least one support connecting rod 3. The rear end of the top cover 2 is pivotally connected to the rear end of the base 1. The support connecting rod 3 is disposed between the base 1 and the top cover 2. A first end of the support connecting rod 3 is connected to the top cover 2, and a second end of the support connecting rod 3 is connected to the base 1. The tent cloth 20 is fitted between the top cover 2 and the base 1. The tent cloth 20 between the front end of the top cover 2 and the front end of the base 1 is provided with an opening.

Figure 1:
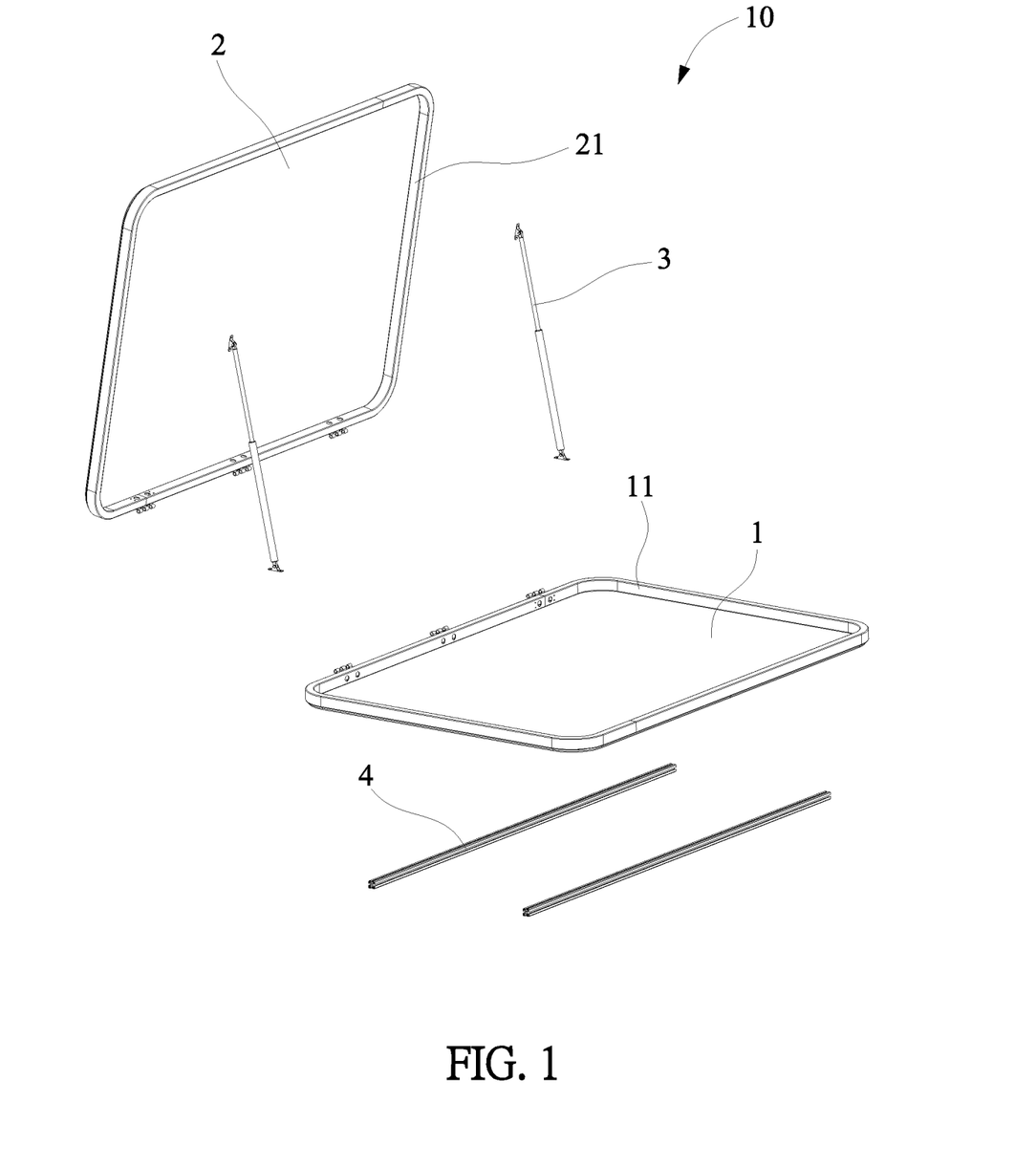
FIG. 1 is an exploded view of a tent rack according to a first embodiment of the present invention.
Figure 2:
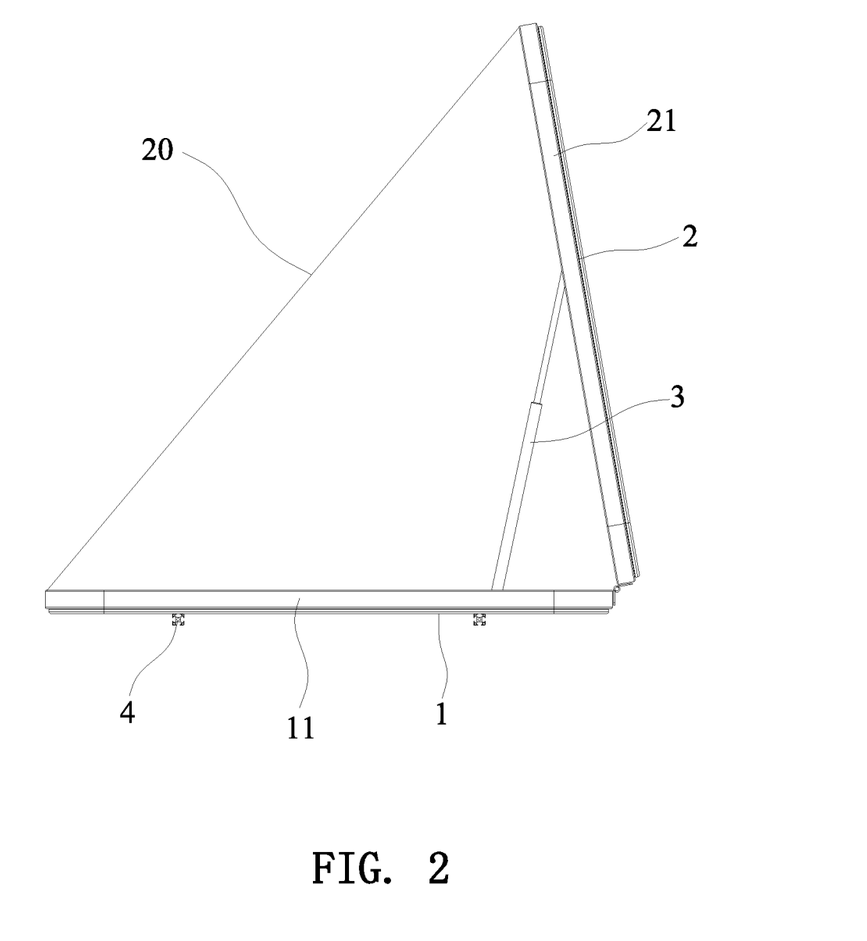
FIG. 2 is a side view of the first embodiment of the present invention in an unfolded state.
Figure 3:
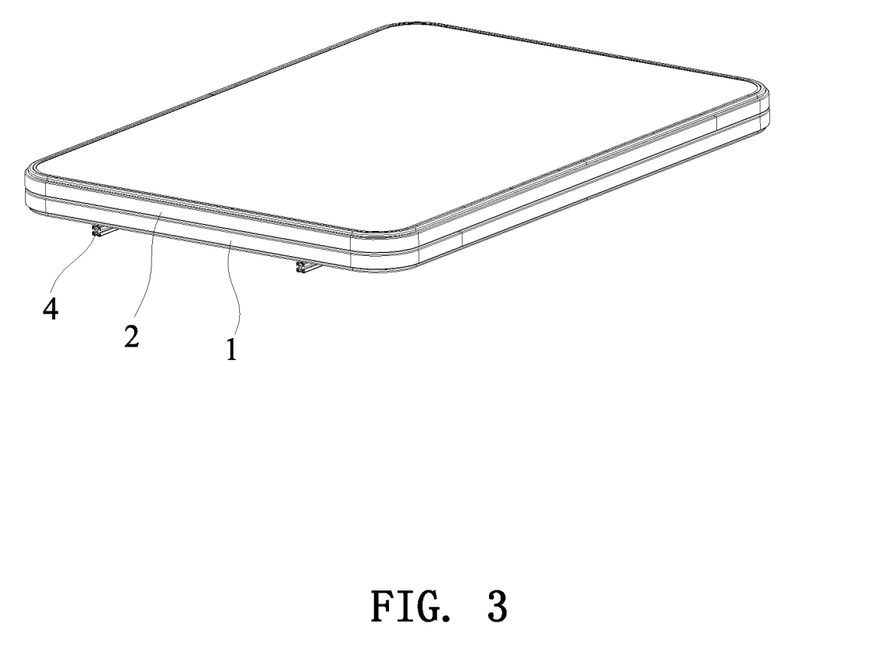
FIG. 3 is a perspective view of the first embodiment of the present invention in a folded state.

FIGS. 1 to 3 illustrate a first embodiment of the present invention. Wherein, a mounting rail 4 may be installed to the bottom of the base 1. Through the mounting rail 4, the present invention can be installed and fixed to a luggage rack on the top of a vehicle. The top cover 2 may be a frame structure or a cover structure. There are different means for pivoting the base 1 and the top cover 2. In this embodiment, the base 1 and the top cover 2 are pivotally connected together by three hinges arranged at intervals, so that the front end of the top cover 2 can be unfolded or folded relative to the base 1.

A retaining wall 21 is provided on the outer periphery of the top cover 2 facing the base 1. A raised wall 11 is provided on the outer periphery of the top of the base 1. The retaining wall 21 corresponds to the raised wall 11. The tent cloth 20 is disposed between the retaining wall 21 and the raised wall 11.

The support connecting rod 3 may be one or more than one in number. When one support connecting rod 3 is provided, the support connecting rod 3 may be directly disposed on the middle of the tent rack 10 or on either side of the tent rack 10. In order to make the tent more beautiful, the support connecting rod 3 may be disposed at the inner sides of the retaining wall 21 and the raised wall 11. In order to increase the strength and stability of the tent rack 10, in this embodiment, two sides of the tent rack 10 are provided with two symmetrical support connecting rods 3. The support connecting rod 3 may be controlled manually or electrically. In this embodiment, the support connecting rod 3 is a telescopic rod, such as an elastic telescopic rod or a telescopic rod with a limit mechanism. The first end of the support connecting rod 3 is pivotally connected to the top cover 2, and the second end of the support connecting rod 3 is pivotally connected to the base 1. The support connecting rod 3 may use a screw rod that is electrically controlled. When the support connecting rod 3 uses a screw rod, the first end of the support connecting rod 3 is pivotally connected to the top cover 2 or the base 1, and the second end of the support connecting rod 3 is slidably disposed on the base 1 or the top cover 2.

As shown in FIG. 3, when the tent is in a folded state, the top cover 2 is closed relative to the base 1, and the support connecting rod 3 and the tent cloth 20 are retracted between the retaining wall 21 of the top cover 2 and the raised wall 11 of the base 1. The folded tent is compact and beautiful. If the support connecting rod 3 is an elastic telescopic rod, when the tent is in a folded state, the elastic telescopic rod is in a compressed energy storage state, and the front end of the top cover 2 and the front end of the base 1 can be fastened together by a lock.

As shown in FIG. 2, when the tent needs to be unfolded for use, the support connecting rod 3 is controlled manually or electrically to lift. When the support connecting rod 3 is controlled manually, the front end of the top cover 2 is lifted so that the top cover 2 drives the support connecting rod 3 to lift. When the support connecting rod 3 is electrically controlled to lift, the top cover 2 is unfolded relative to the front end of the base 1 under the effect of the support connecting rod 3. When the front end of the top cover 2 is unfolded relative to the base 1, the tent cloth 20 is gradually opened. When the support connecting rod 3 is extended to the maximum longest, the top cover 2 will straighten the tent cloth 20 so as to realize the unfolded state of the entire tent.

Conversely, when the tent is to be folded from the unfolded state, the support connecting rod 3 is controlled manually or electrically to be retracted within the base 1 and the top cover 2. When the support connecting rod 3 is controlled manually, the front end of the top cover 2 is pressed toward the front end of the base 1, and the support connecting rod 3 is first retracted and then gradually moved toward the base 1. When the support connecting rod 3 is controlled electrically, the support connecting rod 3 will drive the top cover 2 to approach the base 1 until the front end of the top cover 2 abuts against the front end of the base 1. The tent cloth 20 follows the folding of the top cover 2 from a straight state to gradually loosen, and is retracted within the top cover 2 and the base 1.

Figure 4:
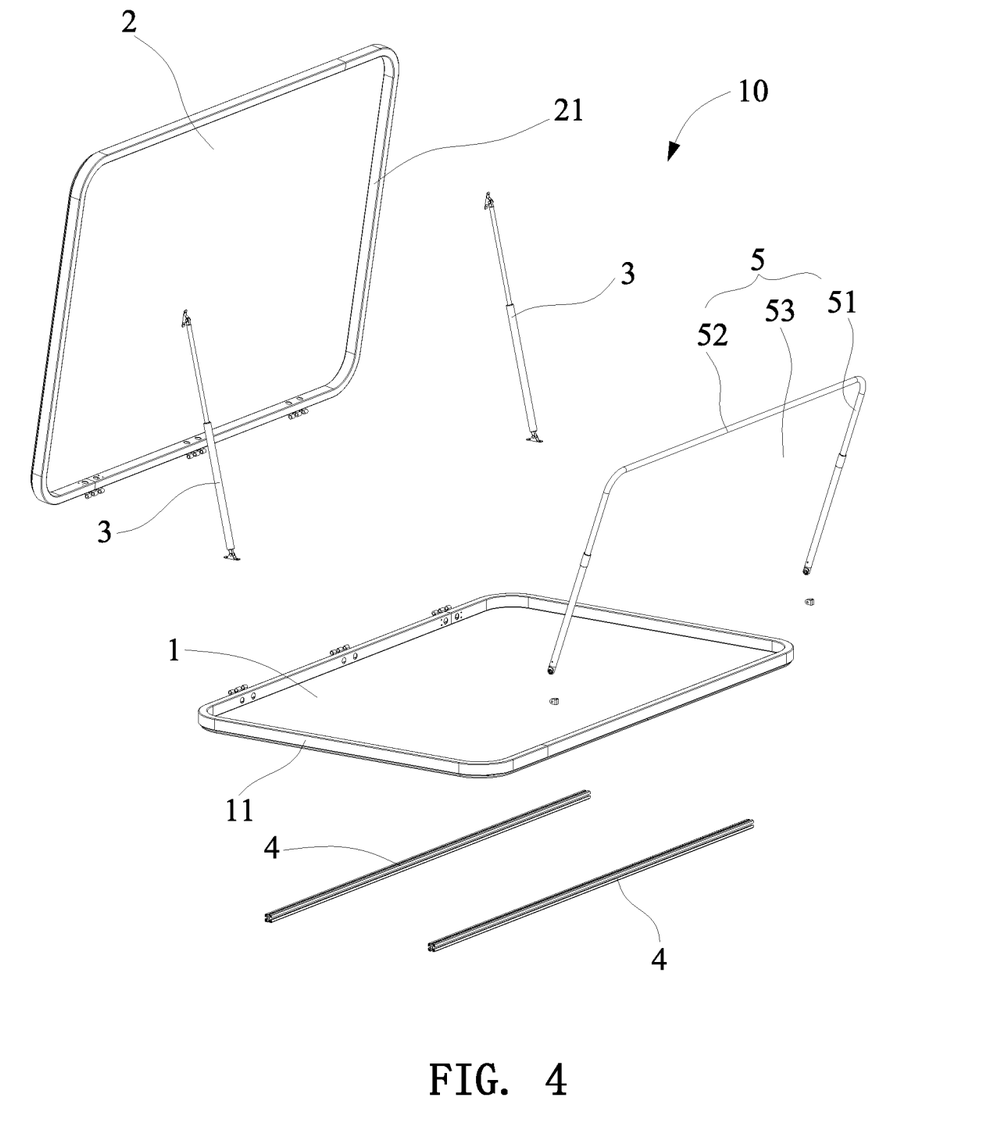
FIG. 4 is an exploded view of a tent rack according to a second embodiment of the present invention.
Figure 5:
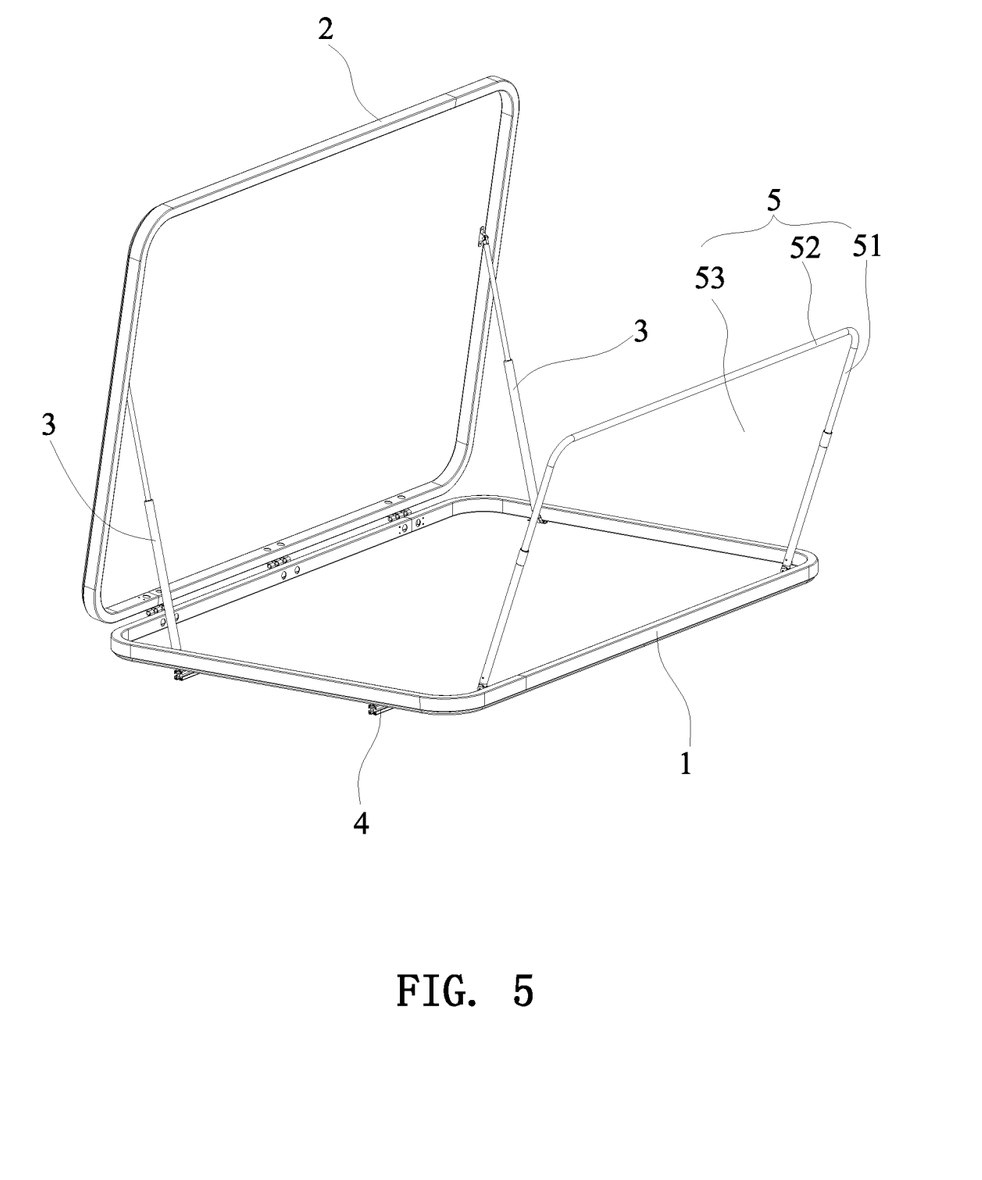
FIG. 5 is a perspective view of the tent rack in an unfolded state according to the second embodiment of the present invention.
Figure 6:
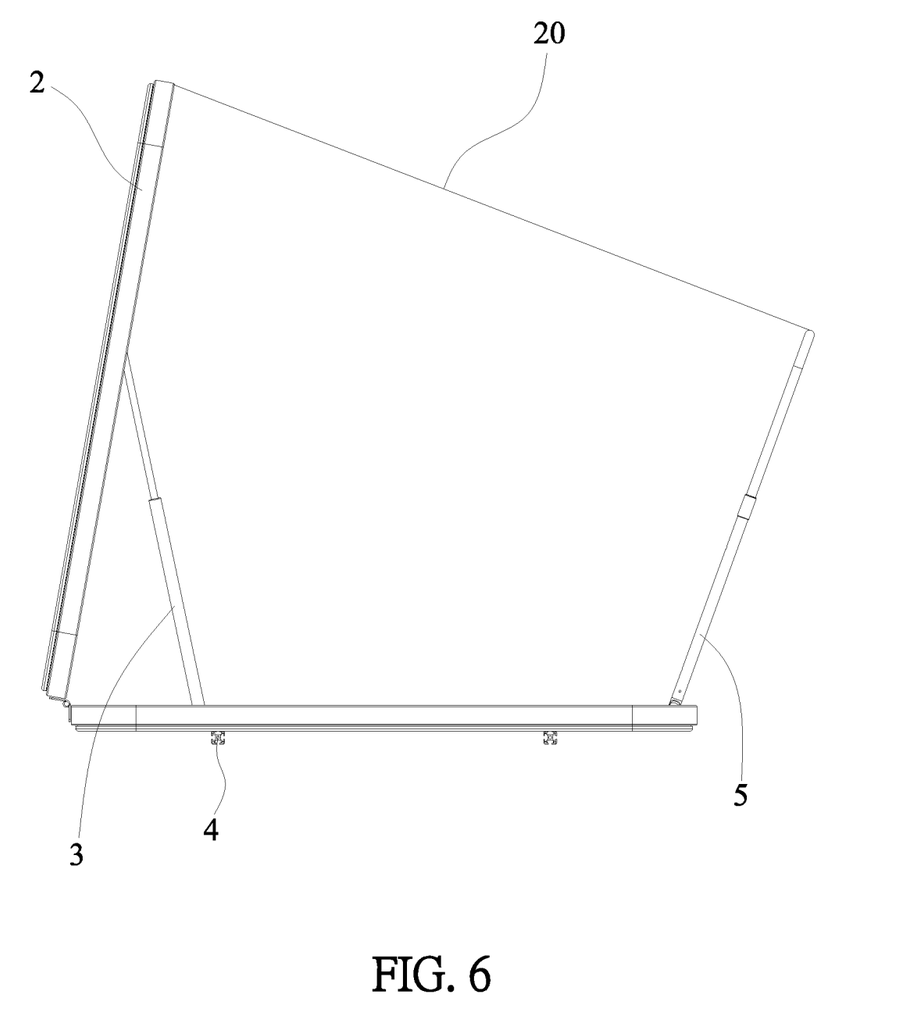
FIG. 6 is a side view of the second embodiment of the present invention in an unfolded state.

FIGS. 4 to 6 illustrate a second embodiment of the present invention. The second embodiment is substantially similar to the first embodiment with the exceptions described hereinafter. The tent rack 10 further includes a front support rod 5. The front support rod 5 is a U-shaped rod having two vertical rods 51, a transverse rod 52, and a U-shaped opening 53 facing downward. The two vertical rods 51 of the front support rod 5 are pivotally connected to the front end of the base 1. The tent cloth 20 is fitted on the transverse rod 52 of the front support rod 5. The opening of the tent cloth 20 is disposed in the U-shaped opening 53 of the front support rod 5. Compared with the first embodiment, the second embodiment is provided with the front support rod 5 to greatly increase the space of the tent. When the tent is unfolded or folded, the front support rod 5 will be unfolded or folded along with the tent cloth 20. For the front support rod 5 to be smoothly retracted within the base 1 and the top cover 2 when being folded, the two vertical rods 51 of the front support rod 5 may use a telescopic rod structure. When the tent is to be folded, the two vertical rods 51 of the front support rod 5 are appropriately compressed and retracted, so that they are smoothly stored within the base 1 and the top cover 2. When the tent is unfolded, the two vertical rods 51 of the front support rod 5 are pulled upward to increase the use space of the tent. It is convenient for the user to enter and exit the tent.

Figure 7:
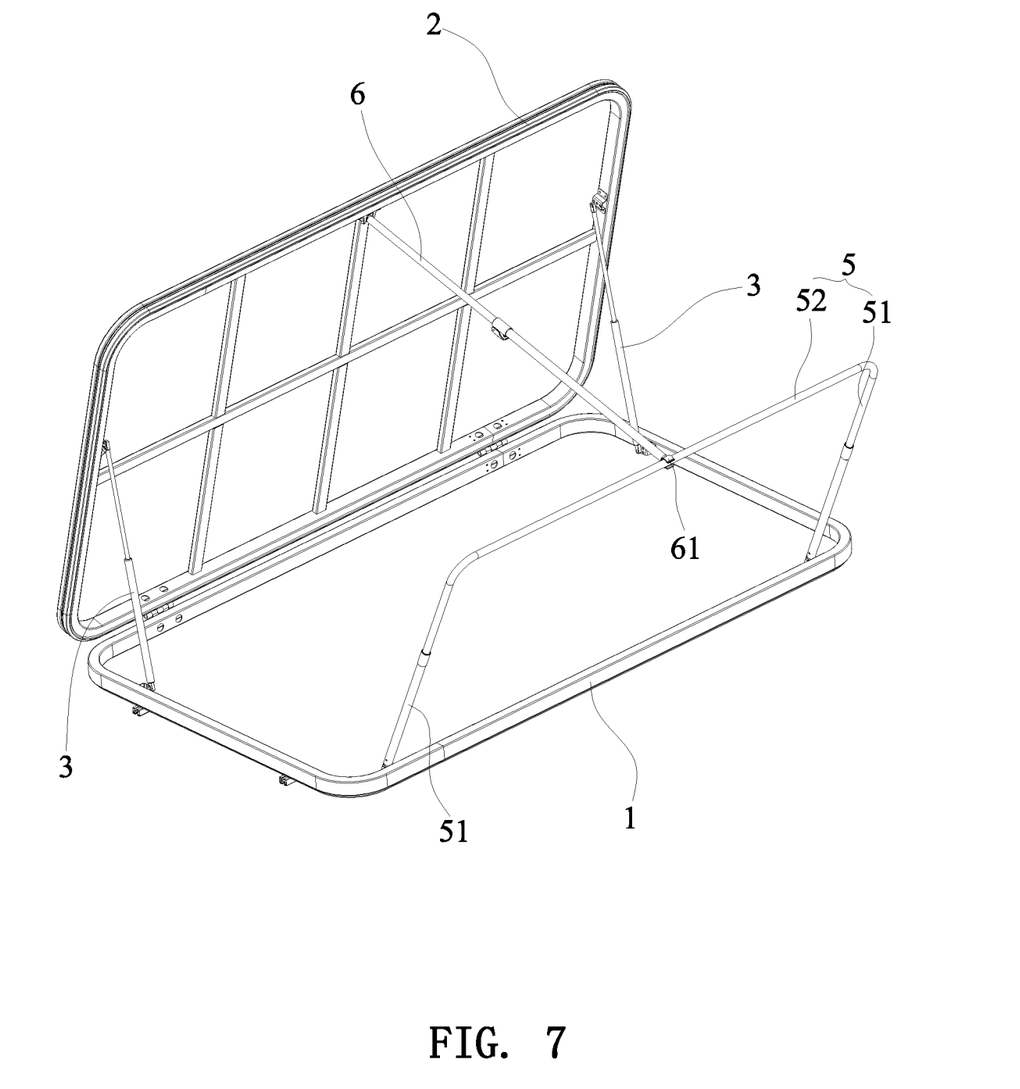
FIG. 7 is a perspective view of a tent rack in an unfolded state according to a third embodiment of the present invention.

FIG. 7 illustrates a third embodiment of the present invention. The third embodiment is based on the second embodiment, and is provided with a top support rod 6. A first end of the top support rod 6 is connected to the front end of the top cover 2, and a second end of the top support rod 6 is connected to the transverse rod 52 of the front support rod 5. In this embodiment, the first end of the top support rod 6 is pivotally connected to a middle portion of the front end of the top cover 2, and the second end of the top support rod 6 is provided with a C-shaped retaining ring 61. The C-shaped retaining ring 61 is detachably connected to a middle portion of the transverse rod 52 of the front support rod 5. In order to facilitate the unfolding and folding of the tent, the top support rod 6 is a telescopic rod in this embodiment. Besides, the top support rod 6 may be replaced by two unidirectional hinged foldable rods or other structures. Through the top support rod 6, when the tent is unfolded, the support strength of the tent can be increased and the tent cloth can be prevented from sagging, which makes the user experience better.

Figure 8:
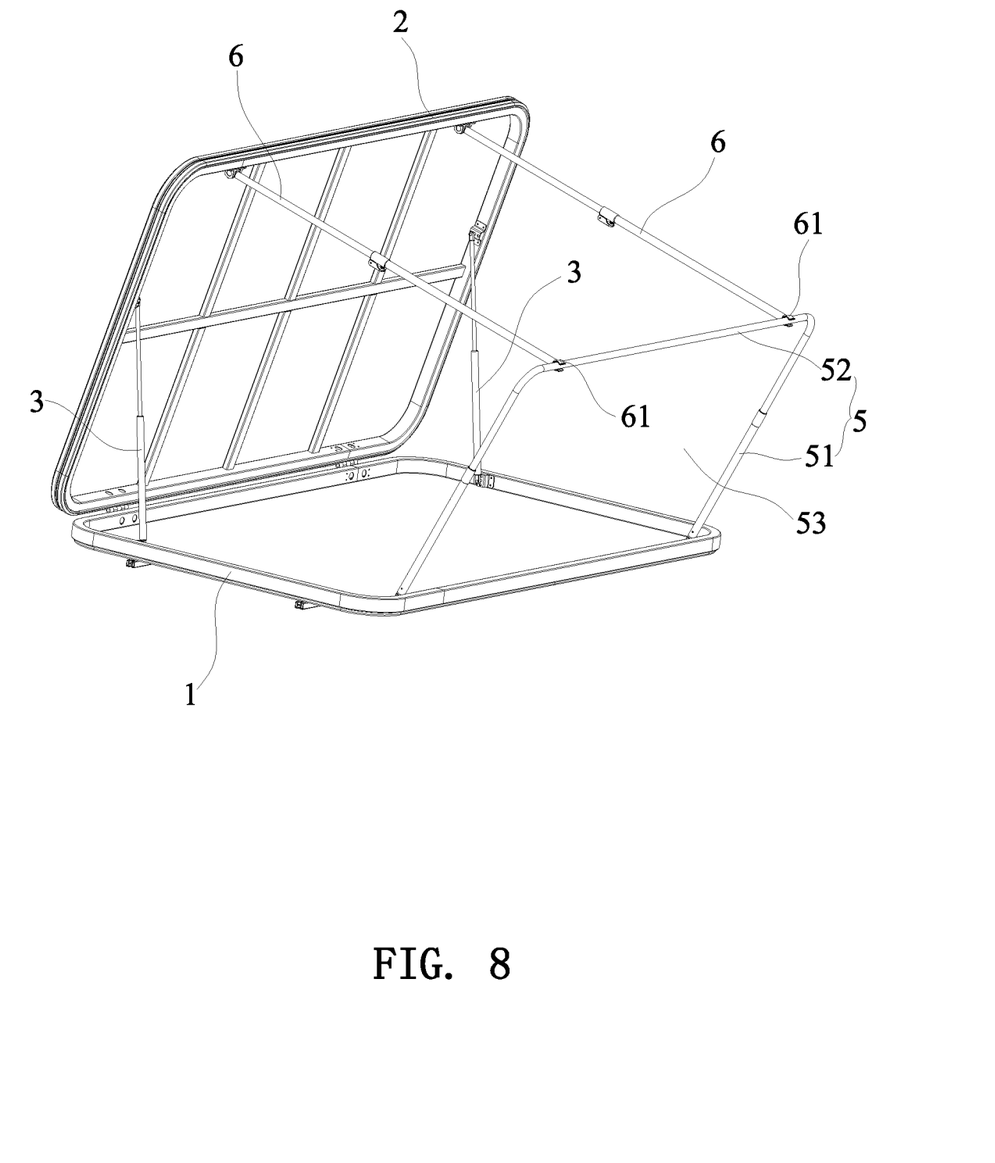
FIG. 8 is a perspective view of a tent rack in an unfolded state according to a fourth embodiment of the present invention.

FIG. 8 illustrates a fourth embodiment of the present invention. The fourth embodiment is substantially similar to the third embodiment with the exceptions described hereinafter. In this embodiment, the tent rack 10 is provided with two top support rods 6. The two top support rods 6 are symmetrically disposed at two sides of the top of the tent. That is, the first ends of the two top support rods 6 are fixedly connected to two sides of the front end of the top cover 2, and the second ends of the two top support rods 6 are detachably connected to two sides of the transverse rod 52 of the front support rod 5 through C-shaped retaining rings 61. This can further prevent the tent cloth from sagging and increase the space inside the tent.

According to the present invention, the rear end of the top cover 2 of the tent rack 10 is directly pivotally connected to the rear end of the base 1, and then the support connecting rod 3 is provided between the base 1 and the top cover 2, so that unfolding and folding of a tent is implemented. When the tent is unfolded or folded, the front end of the top cover 2 is only required to be controlled to be unfolded or folded with respect to the front end of the base 1, and the tent cloth 20 is unfolded or folded with the tent rack 10 in a linkage manner. The tent is simple in structure, easy to unfold or fold, low in costs, and has market competitiveness.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A side supporting type vehicle roof tent, comprising a tent rack and a tent cloth fitted inside the tent rack, the tent rack including a base, a top cover and at least one support connecting rod; a rear end of the top cover being pivotally connected to a rear end of the base, the support connecting rod being disposed between the base and the top cover, a first end of the support connecting rod being connected to the top cover, a second end of the support connecting rod being connected to the base, the tent cloth being fitted between the top cover and the base, wherein a portion of the tent cloth is located between a front end of the top cover and a front end of the base and is provided with an opening, such that the opening of the portion of the tent cloth is located between the front end of the top cover and the front end of the base, wherein the top cover is rotatable relative to the base about the pivotal connection of the rear ends of the top cover and the base between a folded state and an unfolded state, wherein the front end of the top cover is set in alignment with the front end of the base in the the folded state;

wherein the support connecting rod of the tent rack is a screw rod; and the first end and second end of the support connecting rod are connected to the top cover and the base by means of two connection portions, wherein one of the two connection portion comprises a pivotal connection and another one of the two connection portions comprises a slidable connection; and wherein the tent rack further includes a U-shaped front support rod having two vertical rods, a transverse rod and a U-shaped opening facing downward, wherein the two vertical rods of the U-shaped front support rod are pivotally connected to the front end of the base; the tent cloth is fitted on the transverse rod of the U-shaped front support rod; and the opening of the tent cloth is disposed in the U-shaped opening of the U-shaped front support rod.

2. The side supporting type vehicle roof tent as claimed in claim 1, wherein the support connecting rod is disposed on either side of the tent rack.

3. The side supporting type vehicle roof tent as claimed in claim 1, wherein a retaining wall is provided on an outer periphery of the top cover facing the base, and a raised wall is provided on an outer periphery of a top of the base, such that the retaining wall corresponds to the raised wall as being in alignment with each other in the folded state, and the tent cloth is disposed between the retaining wall and the raised wall.

4. The side supporting type vehicle roof tent as claimed in claim 1, wherein the two vertical rods of the U-shaped front support rod are telescopic rods.

5. The side supporting type vehicle roof tent as claimed in claim 1, wherein the tent rack further includes at least one top support rod, a first end of the at least one top support rod is connected to the front end of the top cover, and a second end of the at least one top support rod is connected to the transverse rod of the front support rod.

6. The side supporting type vehicle roof tent as claimed in claim 5, wherein the first end of the at least one top support rod is pivotally connected to a middle portion of the front end of the top cover, the second end of the at least one top support rod is provided with a C-shaped retaining ring, and the C-shaped retaining ring is detachably connected to a middle portion of the transverse rod of the U-shaped front support rod.

7. The side supporting type vehicle roof tent as claimed in claim 5, wherein the at least one top support rod includes two top support rods each of which comprises a first end and an opposite second end, wherein the first ends of the two top support rods are fixedly connected to the front end of the top cover, and the second ends of the two top support rods are detachably connected to the transverse rod of the U-shaped front support rod through C-shaped retaining rings.

* * * * *